(12) United States Patent
Herbel et al.

(10) Patent No.: US 9,709,667 B2
(45) Date of Patent: Jul. 18, 2017

(54) TIMING VALIDATION FOR DATA FUSION

(71) Applicant: Raytheon Command and Control Solutions LLC, Fullerton, CA (US)

(72) Inventors: Richard S. Herbel, Anaheim, CA (US); James W. Rakeman, Brea, CA (US)

(73) Assignee: Raytheon Command and Control Solutions LLC, Waltham, MA (US)

( * ) Notice: Subject to any disclaimer, the term of this patent is extended or adjusted under 35 U.S.C. 154(b) by 462 days.

(21) Appl. No.: 14/448,736

(22) Filed: Jul. 31, 2014

(65) Prior Publication Data

US 2017/0082731 A1  Mar. 23, 2017

(51) Int. Cl.
*G01S 7/40* (2006.01)

(52) U.S. Cl.
CPC .................. *G01S 7/4052* (2013.01)

(58) Field of Classification Search
CPC ...................................... G01S 7/4052
USPC .................. 342/172–175, 31, 395
See application file for complete search history.

(56) References Cited

U.S. PATENT DOCUMENTS

| | | | |
|---|---|---|---|
| 6,240,051 B1 | 5/2001 | Bunks | |
| 8,555,726 B2 | 10/2013 | Barger | |
| 9,170,322 B1 * | 10/2015 | Anderson | G06F 3/0418 |
| 9,407,357 B1 * | 8/2016 | Roggendorf | H04B 7/2693 |
| 2002/0069076 A1 * | 6/2002 | Faris | A63F 13/12 |
| | | | 342/357.4 |
| 2005/0128135 A1 * | 6/2005 | Hester | G01S 13/003 |
| | | | 342/103 |
| 2006/0267832 A1 * | 11/2006 | Newberg | G01S 7/4052 |
| | | | 342/169 |
| 2006/0291537 A1 * | 12/2006 | Fullerton | G01S 7/4052 |
| | | | 375/145 |
| 2008/0152046 A1 * | 6/2008 | Armstrong | H04J 3/0658 |
| | | | 375/343 |
| 2011/0080267 A1 * | 4/2011 | Clare | G01S 13/82 |
| | | | 340/10.4 |
| 2012/0265483 A1 * | 10/2012 | Pelant | G01S 5/06 |
| | | | 702/150 |
| 2014/0354469 A1 * | 12/2014 | Park | G01S 7/28 |
| | | | 342/195 |
| 2016/0245900 A1 * | 8/2016 | Hurtarte | G01S 7/4052 |

* cited by examiner

*Primary Examiner* — John B Sotomayor
(74) *Attorney, Agent, or Firm* — Burns & Levinson LLP; Joseph M. Maraia

(57) ABSTRACT

A synchronization time delay due to a time synchronization protocol between a first sensing system (e.g., a radar system) and a second sensing system (e.g., an optical sensing system) is evaluated. A timing validation system generates a signal and calculates the total time delay between generation of the test signal and receipt of a detection notification communication transmitted from the second sensing system to the timing validation system, via the first sensing system. for the second sensing system to communicate its detection to the timing validation system, via the first sensing system. The synchronization time delay is extracted from the total time delay by removing contributions to the total time delay from additional sources. The calculated synchronization time delay is compared to a threshold delay and, based upon the comparison, generates a result validating or invalidating the time synchronization protocol.

14 Claims, 5 Drawing Sheets

TIMING VALIDATION FOR DATA FUSION

GOVERNMENT SUPPORT

The invention was supported, in whole or in part, by a grant W15P7T-06-D-T001 awarded by the U.S. Department of Defense The Government has certain rights in the invention.

BACKGROUND

Radar is a detection system that employs radio waves to determine movement characteristics of a target object. Radio waves are emitted from a source, reflected from the target object, and received at a detector. For example, the reflected waves detected by a radar system may be analyzed to determine movement characteristics of the target object including, but not limited to, bearing (direction of motion) and range (distance) of the target with respect to the source. Radar has found applicability in a variety of military and commercial applications such as navigation, object tracking, object classification, collision detection, meteorology, and the like.

There exists ongoing interest in combining data acquired by radar systems with other, complementary sensing systems. In some situations, one system will possess an advantage over the other (sensitivity, sensing range, etc.). Furthermore, integrating measured data from other sensing systems with that acquired by radar systems may improve the accuracy of movement characteristics determined from analysis of collected radar data.

In order to allow an event detected by a complementary sensing system to be correlated in time with measured radar data, time synchronization protocols have been developed to coordinate timing between radar systems and complementary sensing systems. However, presently, there is no mechanism for verifying the accuracy of these protocols.

SUMMARY

In an embodiment, a method for validating a time synchronization protocol is provided. The method includes providing one or more processors in communication with a signal source and a first sensing system, receiving, by one or more processors, a command signal from a radar device employing a time synchronization protocol for communication with a second sensing system, where the command signal commands generation of a test signal adapted for detection by the first and second sensing systems, generating, by the signal source, the test signal in response to receipt of the command signal by the one or more processors, determining, by the one or more processors, a first time at which the test signal is generated, receiving, by the one or more processors, a notification indicating detection of the test signal by the second sensing system, where the notification is transmitted to the one or more processors from the second sensing system via the radar system, determining, by the one or more processors, a second time at which the notification is received, where the second time differs from the first time by a time delay comprising a synchronization time delay due to the time synchronization protocol, calculating, by the one or more processors, the synchronization time delay based upon the time delay, and generating, by the one or more processors, a timing validation result based upon the synchronization time delay.

Embodiments of the method further include one or more of the following, alone or in combination.

In an embodiment of the method, the time delay further includes one or more of a propagation time delay representing a time duration for the test signal to travel from the source to the second sensing system, and a communication time delay given by a difference between a time at which the notification is received by the radar system and a time at which the notification is received by the one or more processors.

In an embodiment of the method, generating the timing validation result includes, by the one or more processors, calculating the magnitude of the synchronization time delay, obtaining a threshold delay representing a maximum desired synchronization time delay, generating, for synchronization time delays less than the threshold delay, a first timing validation result validating the time synchronization protocol, and generating, for synchronization time delays greater than or equal to the threshold delay, a second timing validation result invalidating the time synchronization protocol.

In an embodiment of the method, the source is adapted to generate a test signal including an electromagnetic wave having a wavelength selected within the range between about 390 nm to about 700 nm and the time delay does not include the propagation time delay.

In an embodiment of the method, calculating the magnitude of the synchronization time includes obtaining the communication time delay and calculating the magnitude of the synchronization time delay as the difference of each of the first time and the communication time delay from the second time.

In an embodiment of the method, the source is adapted to generate a test signal including an acoustic wave having a frequency within the range between about 20 Hz to about 20,000 Hz and the propagation time delay is given by the time for travel of the acoustic wave from the source to the second sensing system.

In an embodiment of the method, calculating the magnitude of the synchronization time delay includes obtaining the propagation time delay, obtaining the communication time delay, and calculating the magnitude of the synchronization time delay as the difference of each of the first time, the propagation time delay, and the communication time delay from the second time.

In an embodiment, a system for validating a timing synchronization is provided. The system includes a source adapted to generate a test signal, a first sensing system adapted to detect the test signal, a data store operative to maintain a threshold delay for a time synchronization protocol for communication between a radar device and a second sensing system adapted to detect the test signal, and one or more processors in communication with the data store, the source, and the second detector. The one or more processors are adapted to receive a command signal from the radar device, the command signal commanding generation of the test signal by the source, determine a first time at which the test signal is generated, receive a notification indicating detection of the test signal by the second sensing system, where the notification is transmitted to the one or more processors from the second sensing system via the radar system, determine a second time at which the notification is received, where the second time differs from the first time by a time delay comprising a synchronization time delay due to the time synchronization protocol, calculate the synchronization time delay based upon the time delay, and generate a timing validation result based upon the synchronization time delay.

In an embodiment of the system, the time delay further includes one or more of the following: a propagation time delay representing a time duration for the test signal to travel from the source to the second sensing system, and a communication time delay given by a difference between a time at which the notification is received by the radar system and a time at which the notification is received by the one or more processors.

In an embodiment of the system, the one or more processors are further adapted to calculate the magnitude of the synchronization time delay, obtain a threshold delay representing a maximum desired synchronization time delay, generate, for synchronization time delays less than the threshold delay, a first timing validation result validating the time synchronization protocol, and generate, for synchronization time delays greater than or equal to the threshold delay, a second timing validation result invalidating the time synchronization protocol.

In an embodiment of the system, the source is adapted to generate a test signal including an electromagnetic wave having a wavelength selected within the range between about 390 nm to about 700 nm and the time delay does not include the propagation time delay.

In an embodiment of the system, the one or more processors are further adapted to: obtain the communication time delay, and calculate the magnitude of the synchronization time delay as the difference of each of the first time and the communication time delay from the second time.

In an embodiment of the system, the source is adapted to generate a test signal comprising an acoustic wave having a frequency within the range between about 20 Hz to about 20,000 Hz and the propagation time delay is given by the time for travel of the acoustic wave from the source to the second sensing system.

In an embodiment of the system, calculating the magnitude of the synchronization time delay includes: obtaining the propagation time delay, obtaining the communication time delay, and calculating the magnitude of the synchronization time delay as the difference of each of the first time, the propagation time delay, and the communication time delay from the second time.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
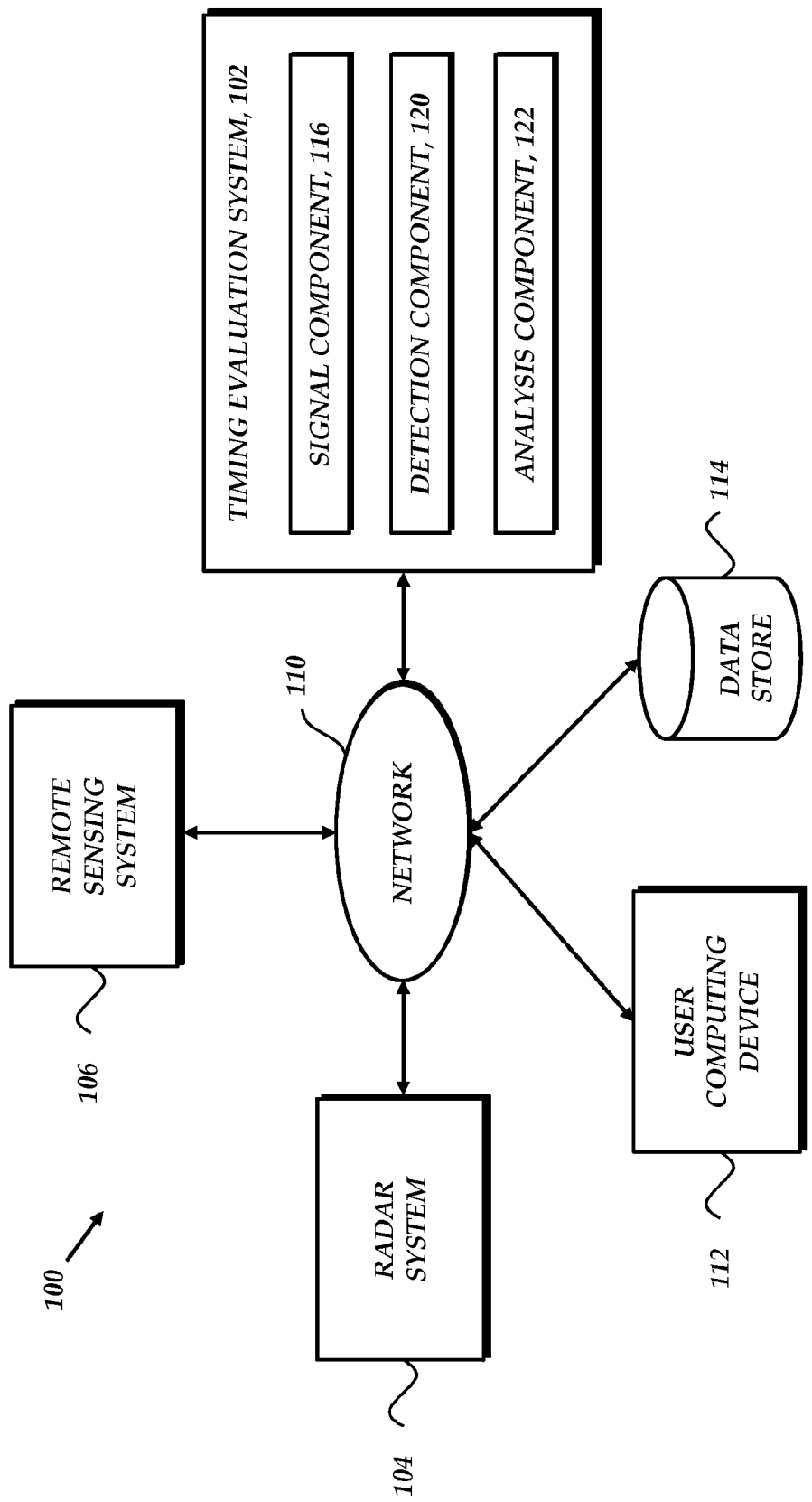
FIG. 1 is a block diagram of an operating environment including an embodiment of a timing evaluation system adapted for evaluating a time synchronization protocol between two complementary sensing systems.

Generally described, embodiments of the present disclosure are directed to systems and methods for evaluating a time synchronization protocol employed between two or more sensing systems in communication with one another. The time synchronization protocol is designed to allow communication between respective detection systems within less than a selected delay time. In so doing, data collected at one detection system may be correlated in time with the remaining detection systems.

As discussed in detail below, embodiments of the disclosed timing evaluation system and methods are adapted to calculate a synchronization time delay arising due to a time synchronization protocol employed by respective sensing systems during communication there-between. The synchronization time delay is compared with a threshold delay (i.e., a maximum desired time attributable to the time synchronization protocol) to evaluate the performance of the time synchronization protocol. The threshold delay may be established based upon a variety of factors including, but not limited to, an arbitrary value, one or more of the respective sensing systems, events of interest to be detected by the respective sensing systems, etc. In the event that the synchronization time delay is less than the threshold delay, the time synchronization protocol may be validated. Alternatively, in the event that the synchronization time delay is greater than the threshold delay, the time synchronization protocol may be invalidated.

In order to properly validate the synchronization time delay, the synchronization time delay is determined independently of time measurements made by either the first or second sensing systems. As discussed in greater detail below, the timing validation system measures the synchronization time delay by conducting a test to determine the time required for communication to travel along a communication pathway that starts and ends with the time synchronization system and further includes a segment between the first and second sensing systems, governed by the time synchronization protocol. For example, embodiments of the timing validation system are provided in communication with the first sensing system (e.g., a radar system) and the second, complementary sensing system (e.g., an optical sensing system). The timing validation system generates a test signal (e.g., an optical flash) detectable by the second sensing system. Upon detection of the test signal, the second sensing system to communicates a notification representing detection of the generated signal to the first sensing system. The first sensing system in turn communicates the notification to the timing validation system. Determining the time at which the test signal is generated provides a measure of the start time of the validation test, determining the time at which the notification is received by the timing validation system provides a measure of the end time of the validation test.

The total test duration, from generation of the test signal to receipt of the notification by the timing validation system, includes a component attributable to the synchronization time delay. Accordingly, the timing validation system may subtract time delays that are not governed by the time synchronization protocol from the total duration of the test to yield the synchronization time delay.

In an embodiment, one such time delay source may include the time required for the signal to travel from the source to the second sensing system, referred to herein a propagation time delay. When the signal is a light signal, the signal travels at the speed of light in air, nearly equal to the speed of light in vacuum (e.g., 299,792.458 km/s). That is to say, in 1 millisecond, the signal travels nearly 299,792.458 m (186.28 miles). Accordingly, in this circumstance, the time for the signal to travel from the source to the second sensing system is very small, as compared to the time synchronization delay, and the propagation time delay can be ignored when calculating the synchronization time delay. However, other signals traveling significantly slower than light, such as acoustic waves, give rise to non-negligible propagation time delays and should be accounted for when calculating the synchronization time delay.

Another possible source of time delay arises during communication between any between any two electronic devices that do not employ the time synchronization protocol. For example, communication delays may arise due by one or more of:

Delay in transmitting notification of a sensed event from a detector to the operating system of a computing device in communication with the detector (e.g., a detector and computing device of the second sensing system).

Delay in recording the time at which notification of a sensed event is received at the computing device from the detector. Such recording time delays may be attributed to an operating system (e.g., delay of the delivery the sensing event to the timestamp of the operating system)

Clock drift between two different computer systems.

Congestion within a network transmitting the notification from one computing device to another (e.g., between the first sensing system and the timing validation system)

It may be understood that communication delays may arise from other sources, without limit, as understood in the art and may also be accounted for according to the disclosed embodiments.

With reference to FIG. 1, a block diagram of an operating environment 100 is illustrated. As discussed in detail below, the environment 100 includes an embodiment of a timing evaluation system 102 for use in validating a time synchronization protocol between a first sensing system 104 and a complementary second sensing system 106 in communication via a network 110. The first and second sensing systems 104, 106 employ a time synchronization protocol when communicating between one another in order to maintain synchronization in their respective timing. The operating environment 100 may further include a user computing device 112 and a data store 114.

The complementary first and second sensing systems 104, 106 may include any sensing systems whose respectively collected data may be fused or integrated together to yield more information than may be obtained by either of the collected data individually. Examples of complementary sensing systems may include, but are not limited to, systems adapted to detect electromagnetic waves, acoustic waves, shock waves, vibration sensors etc.

In an embodiment, the first sensing system 104 is a radar system. The radar system 104 may include any radar system capable of fusing data with the second sensing system 106. Examples include, but are not limited to, radars used for air defense, artillery detection radars, sonar radars, etc. In an embodiment, second sensing system 106 may include detectors adapted to detect one or more of the following: electromagnetic waves, acoustic waves in fluid media (e.g., air, water), vibration waves in solid media (e.g., earth), etc.

In certain embodiments discussed below, the first sensing system 104 is a radar system adapted to transmit and receive radar waves and the second sensing system 106 is an electromagnetic sensing system adapted to transmit and receive other electromagnetic waves and positioned remotely from the first sensing system 104 (e.g., at a selected distance). In other embodiments, the first sensing system 104 is a radar system adapted to transmit and receive radar waves and the second sensing system 106 is an acoustic sensing system adapted to transmit and receive acoustic waves. It may be understood, however, that in alternative embodiments, the timing evaluation system 102 may be adapted for use with other types and numbers of complementary sensing systems, as necessary.

Embodiments of the second sensing system may include one or more electromagnetic detectors adapted to detect electromagnetic waves having wavelengths within one or more selected wavelength ranges. Examples of the one or more selected wavelengths may include, but are not limited to, ultraviolet wavelengths (e.g., about 390 nm to about 100 nm), human-visible wavelengths (e.g., about 390 nm to about 700 nm), and infrared wavelengths (e.g., about 700 nm to about 1 mm).

In certain embodiments, the second sensing system 106 may be an optical sensing system including a detector adapted to detect electromagnetic waves having human-visible wavelengths (e.g., about 390 nm to about 700 nm). In further embodiments, optical detection systems may be adapted to detect selected sub-ranges within the range of optical wavelengths that are characteristic of specific events of interest. Examples may include, but are not limited to, projectile fire (e.g., muzzle flash), rocket fire (e.g., missiles or other powered projectile), engine exhaust, etc.

In an alternative embodiment, the second sensing system 106 may be an acoustic sensing system including a detector adapted to detect acoustic waves within one or more selected frequency ranges. Examples of selected frequency ranges include infrasound frequencies (e.g., less than about 20 Hz), human-audible frequencies (about 20 Hz to about 20 kHz), and ultrasound frequencies (greater than about 20 kHz). Examples of detectors for use with acoustic sensing systems may include, but are not limited to, embodiments of the Raytheon Boomerang system (e.g., U.S. Pat. Nos. 8,555, 726; 6,240,051, incorporated by reference herein in their entirety).

In certain embodiments, the remote sensing system 104 is adapted for detection of human-audible frequencies. In further embodiments, the remote sensing system 104 may be adapted to detect selected sub-ranges within the range of human-audible frequencies that are characteristic of specific events of interest. Examples may include, but are not limited to, projectile fire (e.g., muzzle flash), rocket fire (e.g., missiles or other powered projectile), engines (e.g., ground and/or air-based vehicles), etc.

The radar system 104 and the remote sensing system 106 further employ a timing synchronization protocol. The time synchronization protocol includes, in certain embodiments, a message based protocol where the two systems 104, 106 exchange time messages in order to synchronize timing maintained by the two systems 104, 106, respectively.

Embodiments of the timing evaluation system 102 may include a signal component 116, a detection component 120, and an analysis component 122. The signal component 116 is adapted to generate a test signal for receipt by respective detectors of the detection component 120 and the remote sensing system 106. For example, continuing the example of a radar system and an optical sensing system, the signal component 116 may be adapted to generate an electromagnetic signal at one or more selected wavelengths, referred to herein as a test signal. The signal component 116 may include an electromagnetic source capable of generating electromagnetic signals at wavelengths including, but not limited to, ultraviolet wavelengths (e.g., about 390 nm to about 100 nm), human visible wavelengths (e.g., about 390 nm to about 700 nm), infrared wavelengths (e.g., about 700 nm to about 1 mm). In an embodiment, the test signal is a human-visible light flash.

The detection component 120 of the timing validation system 102 is adapted to detect the test signal generated by the signal component 116. For example, the detector of the detection component may be adapted for detection of one or more of ultraviolet wavelengths (e.g., about 390 nm to about 100 nm), human visible wavelengths (e.g., about 390 nm to about 700 nm), infrared wavelengths (e.g., about 700 nm to about 1 mm). The range of wavelength detectable by the detection component 120 may be the same or different from those of the remote sensing system 106.

The detection component 120 may be further adapted to output a notification to the analysis component 122 when the generated test signal is detected. For example, the notification may include one or more of a time stamp when the message was recorded by the analysis component 122, a signal amplitude level, an inferred direction of the test signal source with respect to the detector (e.g., elevation, azimuth), orientation of the detector at the time of detection (e.g., yaw, pitch, and roll).

The user computing device 112 may represent one or more computing devices for use by a user to provide input and/or receive output from one or more of the timing validation system 102, the radar system 104, and the remote detection system 106. For example, the user computing device 112 may be employed by the user to instruct the timing validation system 102 to generate the test signal. In further embodiments, discussed in greater detail below, the user computing device 112 may provide parameters for use by the analysis component 122 for generating the validation results (e.g., one or more time delays not associated with the time synchronization protocol). The user computing device 112 may communicate directly with the timing validation system 102 or indirectly, via radar system 104.

The data store 114 may include any storage device capable of maintaining data in storage. Examples may include, but are not limited to, static and dynamic memories, magnetic memory devices, solid-state memory devices, and the like.

The network 110 may include one or more communication networks capable of allowing communication between the timing validation system 102, the radar system 104, the remote sensing system 106, the user computing device 112, and the data store 114.

The analysis component 122 may include one or more processors adapted to generate a timing evaluation result for the time synchronization protocol between the radar system 104 and the remote sensing system 106. For example, with further reference to FIGS. 2A-2C and 3, assume the test signal is generated at a time $T_o$, referred to herein as a signal generation time. The analysis component 122 may be adapted to measure $T_o$. The analysis component may be further adapted to determine a time, $T_N$, at which the analysis component 122 receives a notification from the remote sensing system 106 of detection of the generated signal. $T_N$ is also referred to herein as a signal notification time. As discussed in greater detail below, the measured times $T_o$ and $T_N$ may be employed to determine the synchronization time delay.

Figure 2A:
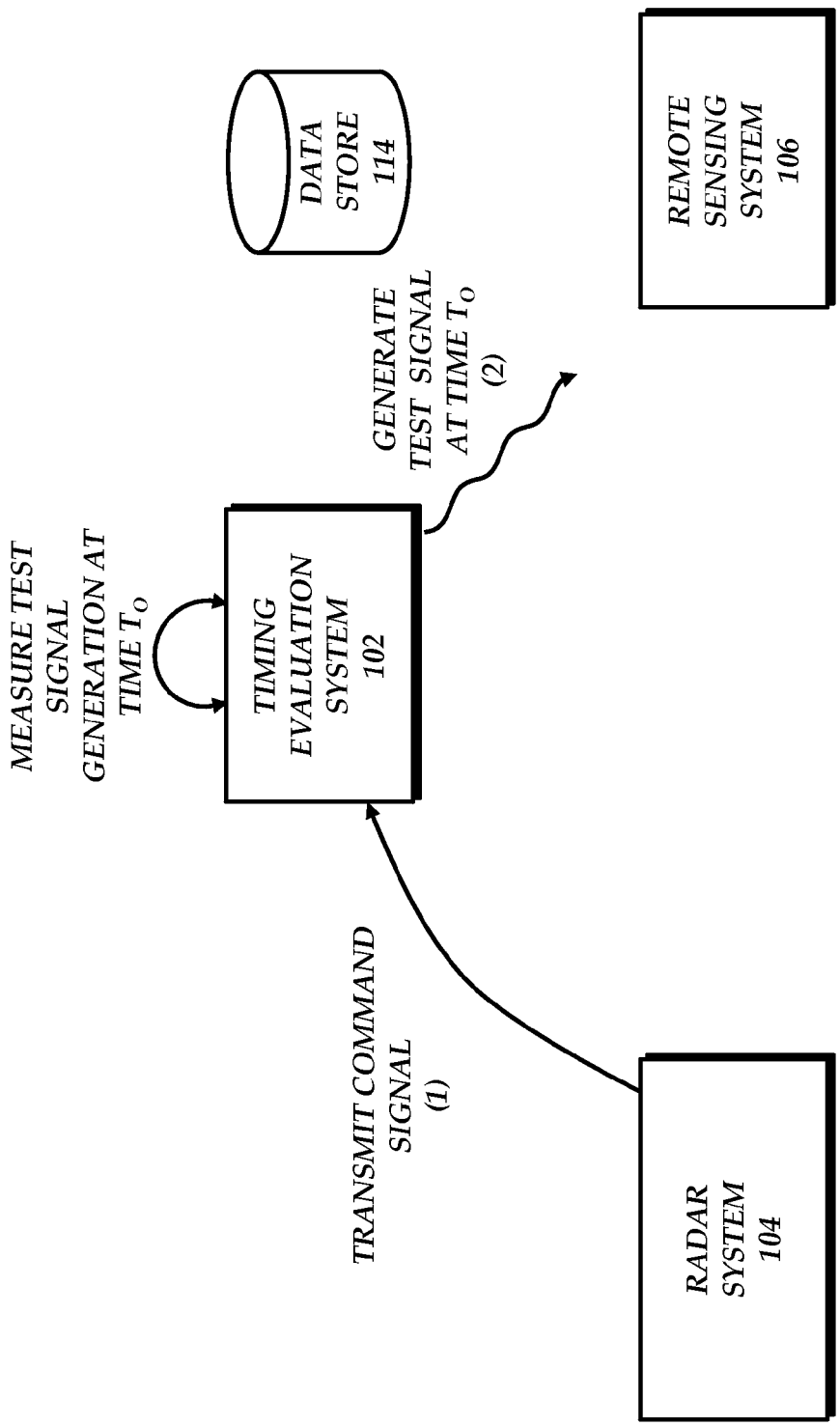
FIG. 2A is a block diagram of the operating environment of FIG. 1, illustrating generation and detection of a test signal by the timing evaluation system in response to a received command.

FIG. 2A is a block diagram of the operating environment of FIG. 1, illustrating generation of the test signal by the timing validation system 102 and determination of the signal generation time, $T_o$. In an embodiment, timing validation system 102 (e.g., the signal component 116) receives a command signal from the radar device 104 commanding generation of the test signal. For example, a user, using his or her user computing device 112 may instruct the radar system 104 to transmit the command signal to the timing validation system 102. In an alternative embodiment (not shown), the user may employ the user computing device to transmit the command signal directly to the timing validation system. In further alternative embodiments, the timing validation system may receive the command signal from another device.

In response to receipt of the command signal, the timing validation system 102 may generate the test signal. For example, the signal component 116 may include a source that generates the test signal. As discussed above, the test signal may be an electromagnetic signal having one or more selected wavelengths, an acoustic wave having one or more selected frequencies, or another type of signal adapted for receipt by the timing evaluation system and the remote sensing system. The selected wavelengths may be included in the transmitted command signal or adopt one or more default values.

Upon generation of the test signal, the timing validation system 102 further detects the test signal to determine the signal generation time $T_o$. For example, the detection component 120 may include a detector adapted to detect the test signal. As discussed above, the detector may be adapted to detect electromagnetic signals having one or more selected wavelengths, an acoustic wave having one or more selected frequencies, or another type of signal adapted for receipt by the timing evaluation system and the remote sensing system. In response to detection of the test signal, the detection component 120 informs the analysis component 122 that the test signal has been detected and the analysis component 122 measures the signal generation time as the current time.

In certain circumstances, one or more communication delays may be known to occur between generation of the signal at $T_o$ and recording the current time of detection, $T'_o$. That is to say, the time at which the timing validation system records detection of the signal generation lags the actual time of signal generation. Assume the total time of all such communication delays is known and given by $\Delta C_1$. The analysis component 122 may employ the measured $T'_o$ and known $\Delta C_1$ to determine $T_o$ according to the relationship $T_o = T'_o - \Delta C_1$. In certain embodiments, $\Delta C_1$ is a constant value and may be obtained by the analysis component 122 from the data store 114 or a user input. In embodiments where the communication delay between $T_o$ and $T'_o$ is negligible, $\Delta C_1$ may be assumed to be zero and $T'_o$ may be taken to be equal to $T_o$. For the purposes of the discussion below, it will be assumed that $T'_o = T_o$. However, if this assumption is not appropriate for a given circumstance, $T_o$ may be replaced with $T'_o - \Delta c_1$.

Figure 2B:
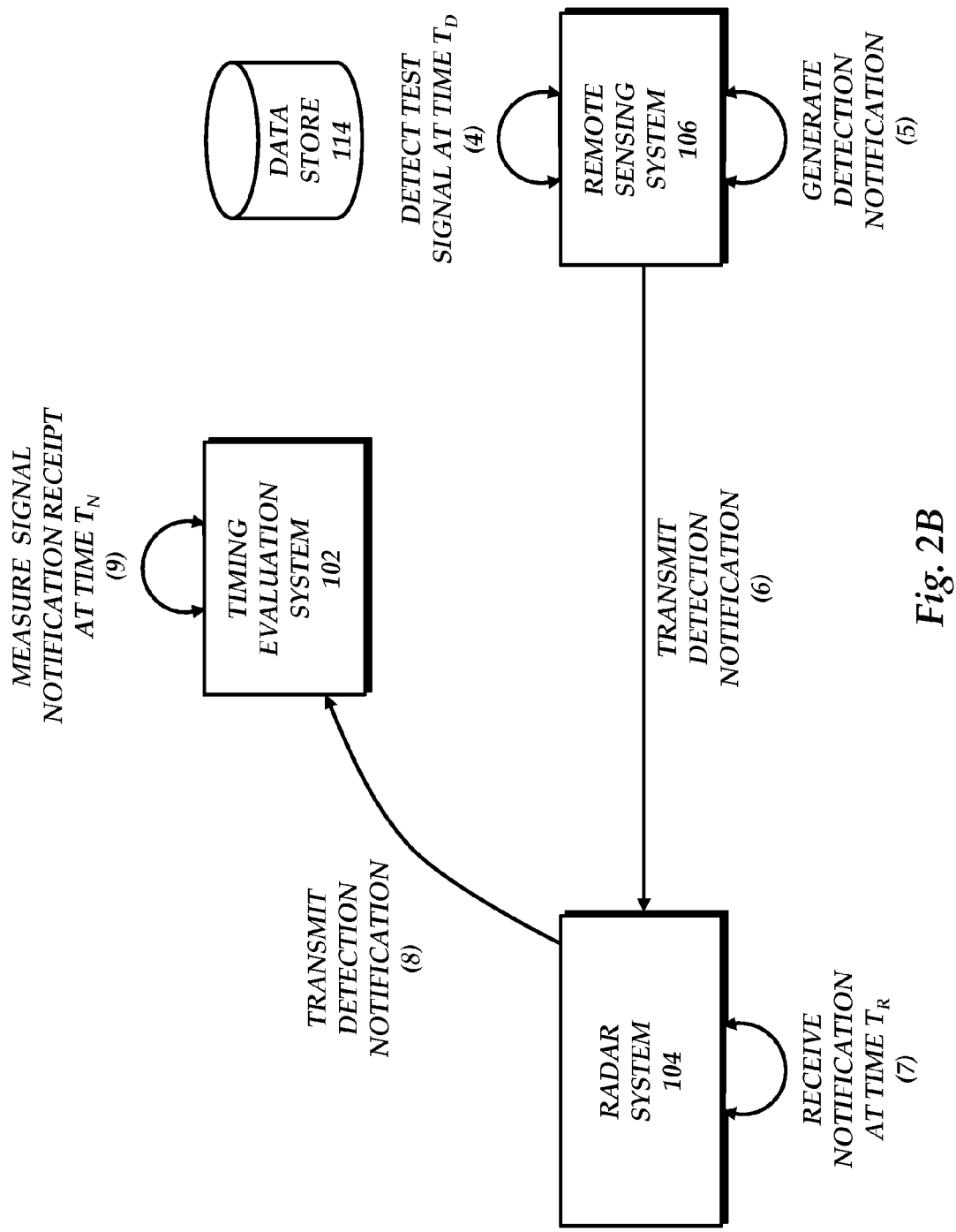
FIG. 2B is a block diagram of the operating environment of FIG. 1, illustrating detection of the test signal by the remote detection system.

With reference to FIG. 2B a block diagram of the operating environment of FIG. 1 is illustrated, showing communication of a detection notification from the remote sensing system 106 to the timing evaluation system 102. For example, the test signal is detected by the remote sensing system 106 at time $T_D$, referred to herein as signal detection time. In general, the signal detection time, $T_D$, exceeds the signal generation time, $T_o$, by a propagation time delay, $\Delta p$, (i.e., $T_D = T_o + \Delta p$). In certain embodiments, $\Delta p$ is a constant value and may be obtained by the analysis component 122 from the data store 114 or a user input. In embodiments where the propagation time delay is negligible (e.g., less than about 5 ms), $\Delta p$ may be assumed to be zero and $T_{D'}$ may be taken to be equal to $T_o$.

In response to detection of the test signal, the remote sensing system 106 may further generate and transmit a detection notification to the radar system 104. This detection notification is received by the radar system 104 at time $T_R$, also referred to herein as a radar receipt time. The radar receipt time, $T_R$, may exceed the signal detection time, $T_D$, by the synchronization time delay, $\Delta SD$ (i.e., $T_R = T_D + \Delta SD$). It is assumed that any delays arising between detection of the test signal by the remote sensing system 106 to communication of the notification to the radar system 104 (e.g., detector-based delays, operating system-based delays, network congestion delays, etc.), are accounted for within $\Delta SD$.

The radar system 104 may further transmit the received detection notification to the timing evaluation system 102. The detection notification is recorded as being received by the timing evaluation system 102 at time $T_N$. In general, the notification time, $T_N$, differs from the radar receipt time, $T_R$, by a second communication time delay, $\Delta C_2$, (i.e., $T_R = T_N - \Delta C_2$). In certain embodiments, $\Delta C_2$ is a constant value and may be obtained by the analysis component 122 from the data store 114 or a user input. In embodiments where the second communication time delay is negligible is negligible (e.g., less than about 5 ms), $\Delta C_2$ may be assumed to be zero and $T_{N'}$ may be taken to be equal to $T_R$.

Figure 2C:
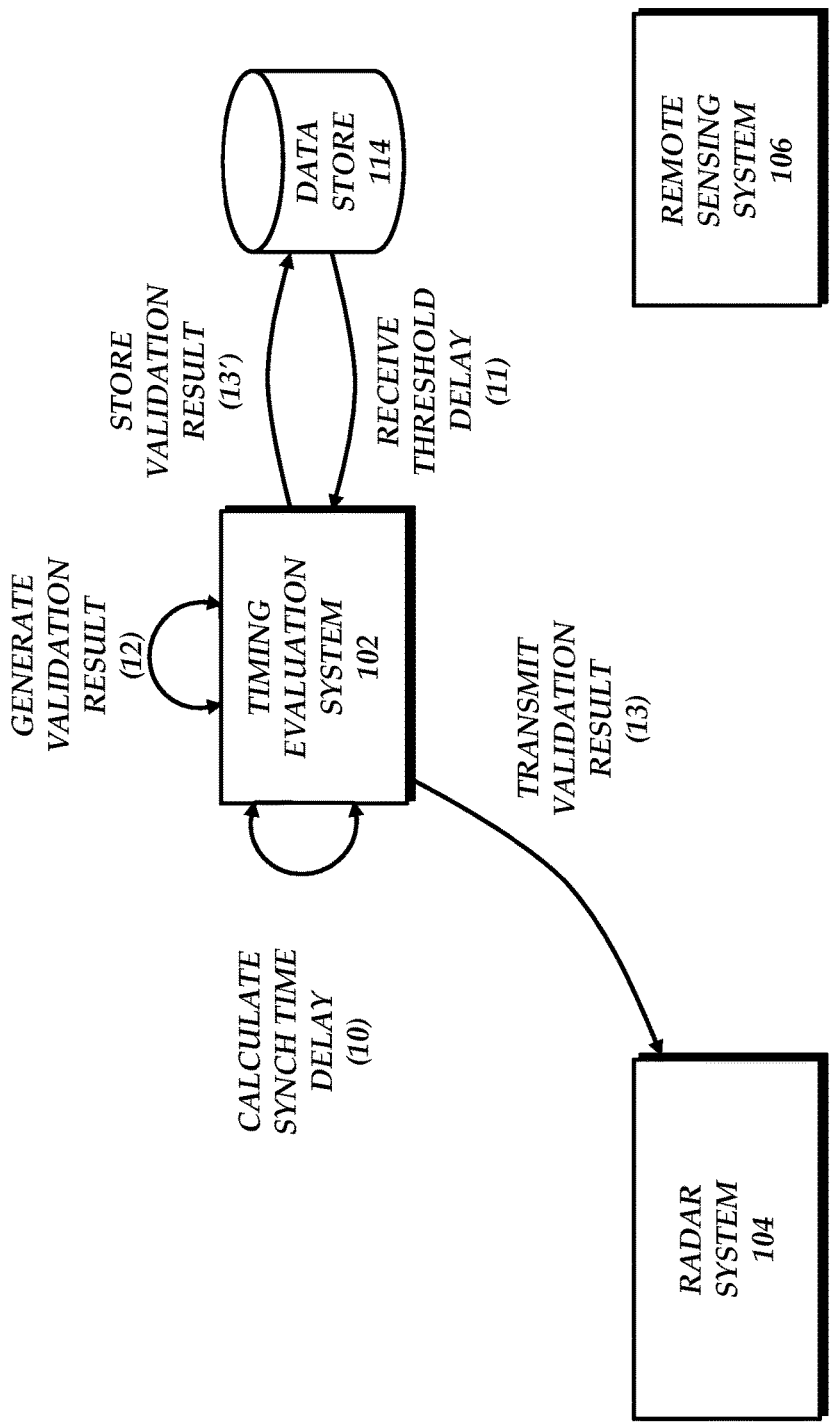
FIG. 2C is a block diagram of the operating environment of FIG. 1, illustrating generation of a timing validation result for the time synchronization protocol.

With reference to FIG. 2C, the operating environment of FIG. 1 is illustrated, demonstrating generation of the timing validation result by the timing evaluation system 102 for the time synchronization protocol. In an embodiment, analysis component 122 calculates the synchronization time delay, $\Delta SD$, between $T_R$ and $T_D$. While $T_R$ and $T_D$ are not measured directly, they may be represented in terms of the times $T_o$ and $T_N$, as well as known values for communication time delays (e.g., $\Delta C_1$, $\Delta C_2$, etc.) and the propagation time delay $\Delta p$, as discussed above. The timing evaluation result may be calculated on the basis of a single measurement or an average of multiple measurements, as necessary.

Figure 3:
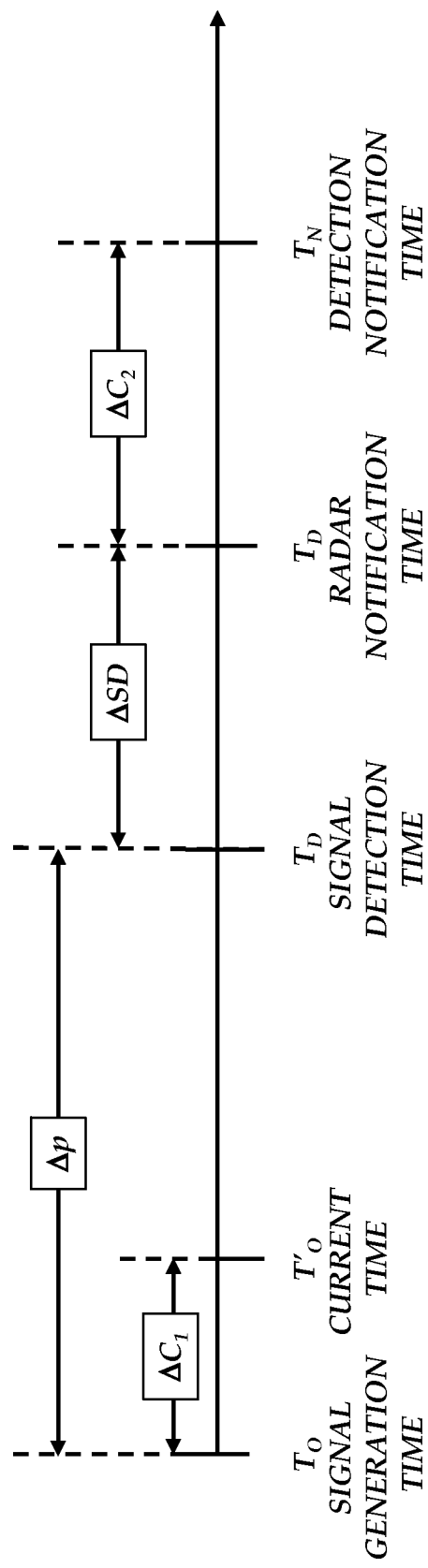
FIG. 3 is a timing diagram illustrating components of time delay between a signal generation event and receipt of a notification by the timing evaluation system indicating detection of the signal by a remote sensing system.

As illustrated in FIG. 3, the total time delay between measurement of $T_o$ and $T_N$ is given by the difference $T_N - T_o$. As illustrated in FIG. 3, this difference may be further represented as the combination of $\Delta p$, $\Delta SD$, and $\Delta C_2$ $$T_N - T_o = \Delta p + \Delta SD + \Delta C_2 \quad (1)$$

Rearranging Equation 1 to solve for $\Delta SD$ yields Equation 2:

$$\Delta SD = T_N - T_o - \Delta p - \Delta C_2 \quad (2)$$

Expanding $T_o$ in Equation (2) to account for circumstances in which $\Delta C_1$ is not negligible (i.e., $T_o = T'_o - \Delta C_1$) yields:

$$\Delta SD = T_N - T'_o + \Delta C_1 - \Delta p - \Delta C_2 \quad (3)$$

With further reference to Equation 3, under circumstances where additional communication delay sources are present within the operating environment that contribute to communication time delays after measurement of the signal generation time, Equation 3 may be rewritten as:

$$\Delta SD = T_N - T'_o - \Delta p - \Delta c \quad (4)$$

where the magnitude and sign of $\Delta C_1$, $\Delta C_2$ and any additional communication delays are replaced by $-\Delta C$. Accordingly, $\Delta C$ represents the sum of all communication delays. For example, assume a modification of the example discussed above in which the radar system communicates with the timing evaluation system via an intermediate system that introduces a communication time delay $\Delta C_3$, not accounted for by $\Delta C_2$, while $\Delta C_1$ remains zero. In this circumstance, $\Delta c$ in Equation 6 would be given by $\Delta C = \Delta c_2 + \Delta c_3$. Thus, Equation 4 may account for any number of communication time delays contributing to the total time delay between $T_o$ and $T_N$.

Equation 4 may be further simplified under certain circumstances. For example, assuming that $\Delta c$ is negligible, $\Delta c$ may be eliminated from Equation 4 to yield:

$$\Delta SD = T_N - T'_o - \Delta p \quad (5)$$

Note that $T'_o$ is equal to $T_o$ in this limiting case. Alternatively, beginning from Equation 4 and assuming that $\Delta p$ is negligible, $\Delta p$ may be eliminated from Equation 4 to yield:

$$\Delta SD = T_n - T'_o - \Delta c \quad (6)$$

With further reference to FIG. 2C, the timing evaluation system 102 generates a validation result based upon the calculated synchronization time delay. For example, the analysis component 102 may obtain a threshold delay for comparison with the synchronization time delay. The threshold delay represents the maximum desired synchronization time delay for which the time synchronization protocol may be considered valid. In certain embodiments, the analysis component 122 may obtain the threshold delay from the data store 114, as illustrated in FIG. 2C. In alternative embodiments, the analysis component 122 may obtain the threshold delay from user input.

Once the threshold delay is received by the timing evaluation system 102, the analysis component 122 may compare the threshold delay to the synchronization time delay in order to generate the validation result. For synchronization time delays less than the threshold delay, the analysis component 122 may generate a timing validation result validating or approving the time synchronization protocol. For synchronization time delays greater than or equal to the threshold delay, the analysis component 122 may generate a timing validation result invalidating or disqualifying the time synchronization protocol.

After generating the validation result, the timing evaluation system 102 may provide the result to the data store 114 for storage. Alternatively or additionally, the timing evaluation system 102 may transmit the result to the user directly or via the radar system 104. In certain embodiments, when the synchronization time delay is validated, the radar data may be fused (e.g., correlated in time) with data from the complementary sensor, allowing the measured radar data to be "backtracked" to the time of an event detected by the remote sensing system 106. In this manner, the radar system 104 may be employed to determine the location of the of detected event. In other embodiments, if the time synchronization protocol is invalidated, a fault warning may be issued (e.g., by one or more of the timing evaluation system, the radar system, and/or the remote sensing system). Such a fault warning may be indicative of a need for maintenance and/or repair of the radar system and/or the remote sensing system.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

The terms comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for validating a time synchronization protocol, comprising:
   providing one or more processors in communication with a signal source and a first sensing system;
   receiving, by one or more processors, a command signal from a radar device employing a time synchronization protocol for communication with a second sensing system, wherein the command signal commands generation of a test signal adapted for detection by the first and second sensing systems;

generating, by the signal source, the test signal in response to receipt of the command signal by the one or more processors;

determining, by the one or more processors, a first time at which the test signal is generated;

receiving, by the one or more processors, a notification indicating detection of the test signal by the second sensing system, wherein the notification is transmitted to the one or more processors from the second sensing system via the radar system;

determining, by the one or more processors, a second time at which the notification is received, wherein the second time differs from the first time by a time delay comprising a synchronization time delay due to the time synchronization protocol;

calculating, by the one or more processors, the synchronization time delay based upon the time delay; and generating, by the one or more processors, a timing validation result based upon the synchronization time delay.

2. The method of claim 1, wherein the time delay further comprises one or more of the following:

a propagation time delay representing a time duration for the test signal to travel from the source to the second sensing system; and a communication time delay given by a difference between a time at which the notification is received by the radar system and a time at which the notification is received by the one or more processors of the timing evaluation system.

3. The method of claim 2, wherein generating the timing validation result comprises, by the one or more processors:

calculating the magnitude of the synchronization time delay;

obtaining a threshold delay representing a maximum desired synchronization time delay;

generating, for synchronization time delays less than the threshold delay, a first timing validation result validating the time synchronization protocol; and generating, for synchronization time delays greater than or equal to the threshold delay, a second timing validation result invalidating the time synchronization protocol.

4. The method of claim 3, wherein the source is adapted to generate a test signal comprising an electromagnetic wave having a wavelength selected within the range between about 390 nm to about 700 nm and wherein the time delay does not include the propagation time delay.

5. The method of claim 4, wherein calculating the magnitude of the synchronization time delay comprises:

obtaining the communication time delay; and calculating the magnitude of the synchronization time delay as the difference of each of the first time and the communication time delay from the second time.

6. The method of claim 3, wherein the source is adapted to generate a test signal comprising an acoustic wave having a frequency within the range between about 20 Hz to about 20,000 Hz and wherein the propagation time delay is given by the time for travel of the acoustic wave from the source to the second sensing system.

7. The method of claim 6, wherein calculating the magnitude of the synchronization time delay comprises:

obtaining the propagation time delay;

obtaining the communication time delay; and calculating the magnitude of the synchronization time delay as the difference of each of the first time, the propagation time delay, and the communication time delay from the second time.

8. A system for validating a timing synchronization, comprising:

a source adapted to generate a test signal;

a first sensing system adapted to detect the test signal, a data store operative to maintain a threshold delay for a time synchronization protocol for communication between a radar device and a second sensing system adapted to detect the test signal; and one or more processors in communication with the data store, the source, and the second detector, the one or more processors adapted to:

receive a command signal from the radar device, the command signal commanding generation of the test signal by the source;

determine a first time at which the test signal is generated;

receive a notification indicating detection of the test signal by the second sensing system, wherein the notification is transmitted to the one or more processors from the second sensing system via the radar system;

determine a second time at which the notification is received, wherein the second time differs from the first time by a time delay comprising a synchronization time delay due to the time synchronization protocol;

calculate the synchronization time delay based upon the time delay; and generate a timing validation result based upon the synchronization time delay.

9. The system of claim 8, wherein the time delay further comprises one or more of the following:

a propagation time delay representing a time duration for the test signal to travel from the source to the second sensing system; and a communication time delay given by a difference between a time at which the notification is received by the radar system and a time at which the notification is received by the one or more processors.

10. The system of claim 9, wherein the one or more processors are further adapted to:

calculate the magnitude of the synchronization time delay;

obtain a threshold delay representing a maximum desired synchronization time delay;

generate, for synchronization time delays less than the threshold delay, a first timing validation result validating the time synchronization protocol; and generate, for synchronization time delays greater than or equal to the threshold delay, a second timing validation result invalidating the time synchronization protocol.

11. The system of claim 10, wherein the source is adapted to generate a test signal comprising an electromagnetic wave having a wavelength selected within the range between about 390 nm to about 700 nm and wherein the time delay does not include the propagation time delay.

12. The system of claim 11, wherein the one or more processors are adapted to:

obtain the communication time delay; and calculate the magnitude of the synchronization time delay as the difference of each of the first time and the communication time delay from the second time.

13. The system of claim 10, wherein the source is adapted to generate a test signal comprising an acoustic wave having a frequency within the range between about 20 Hz to about 20,000 Hz and wherein the propagation time delay is given by the time for travel of the acoustic wave from the source to the second sensing system.

14. The system of claim 13, wherein calculating the magnitude of the synchronization time delay comprises:
   obtaining the propagation time delay;
   obtaining the communication time delay; and
   calculating the magnitude of the synchronization time delay as the difference of each of the first time, the propagation time delay, and the communication time delay from the second time.

* * * * *